United States Patent [19]

Miller et al.

[11] Patent Number: 5,268,014
[45] Date of Patent: Dec. 7, 1993

[54] METHOD OF MAKING ROBUST FIBER OPTIC COUPLER

[75] Inventors: William J. Miller, Corning; Richard A. Quinn, Horseheads, both of N.Y.

[73] Assignee: Corning Incorporated, Houghton Park, N.Y.

[21] Appl. No.: 972,417

[22] Filed: Nov. 5, 1992

[51] Int. Cl.⁵ .................. C03C 25/02; B32B 31/00
[52] U.S. Cl. .......................... 65/4.21; 156/275.5; 156/275.7; 156/286; 156/294
[58] Field of Search ............. 65/4.1, 4.2, 4.21; 285/260; 156/293, 294, 275.5, 275.7, 286

[56] References Cited

U.S. PATENT DOCUMENTS

| | | | |
|---|---|---|---|
| 4,398,660 | 8/1983 | Pampalone et al. | 156/332 |
| 4,767,430 | 8/1988 | Deneka et al. | 65/4.2 |
| 4,902,324 | 2/1990 | Miller et al. | 65/3.11 |
| 5,011,251 | 4/1991 | Miller et al. | 385/43 |
| 5,013,117 | 5/1991 | Fukuma | 385/15 |
| 5,017,206 | 5/1991 | Miller et al. | 65/3.11 |

*Primary Examiner*—David A. Simmons
*Assistant Examiner*—Chester T. Barry
*Attorney, Agent, or Firm*—W. J. Simmons, Jr.

[57] ABSTRACT

After a plurality of optical fibers are fused to make a fiber optic coupler, the ends thereof are glued to a substrate to provide the outwardly extending fibers with adequate pull strength. The glue can flow from the point of application toward the fused region where it can adversely affect the the device. To prevent the glue from flowing too far toward the fused region and yet permit sufficient flow to strengthen the fibers, a beam of UV light is directed onto the fibers at that predetermined point where glue flow should stop. When the glue is cured by the beam, it stops flowing. Thereafter, the remainder of the glue is cured.

15 Claims, 3 Drawing Sheets

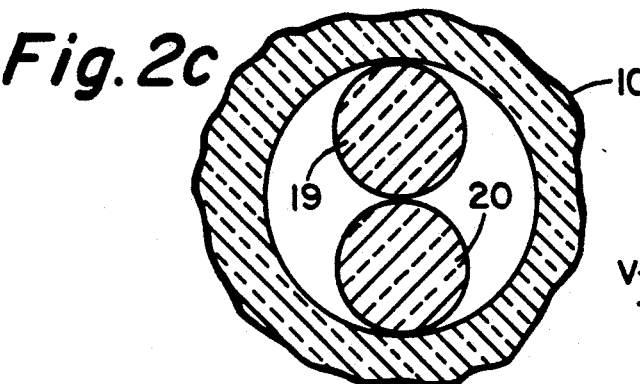
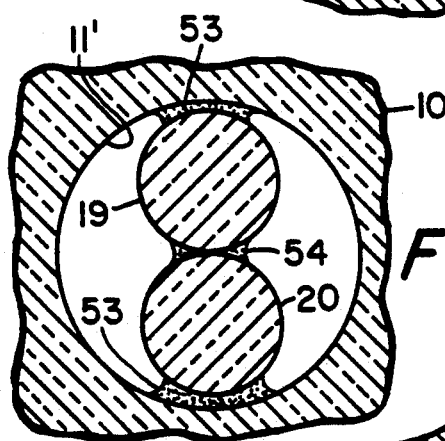
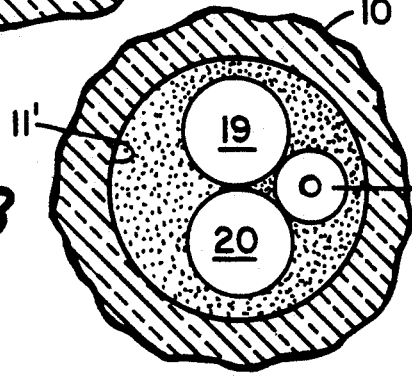
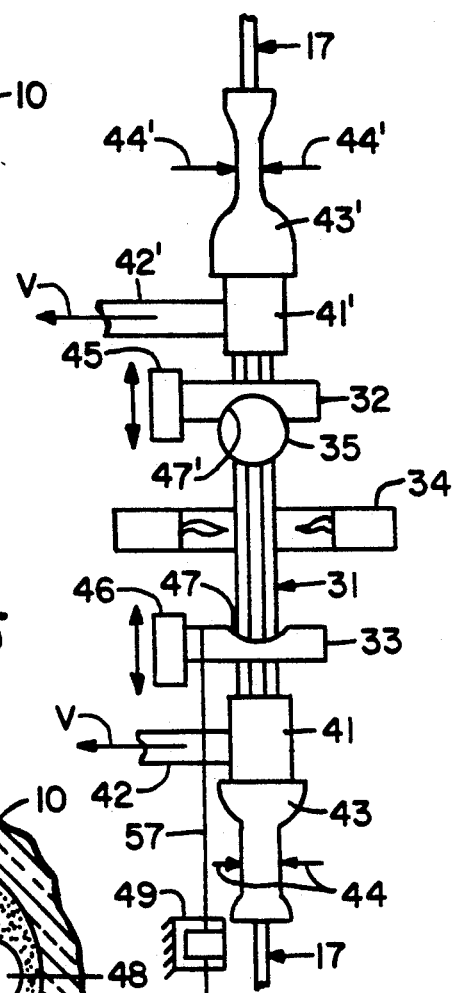
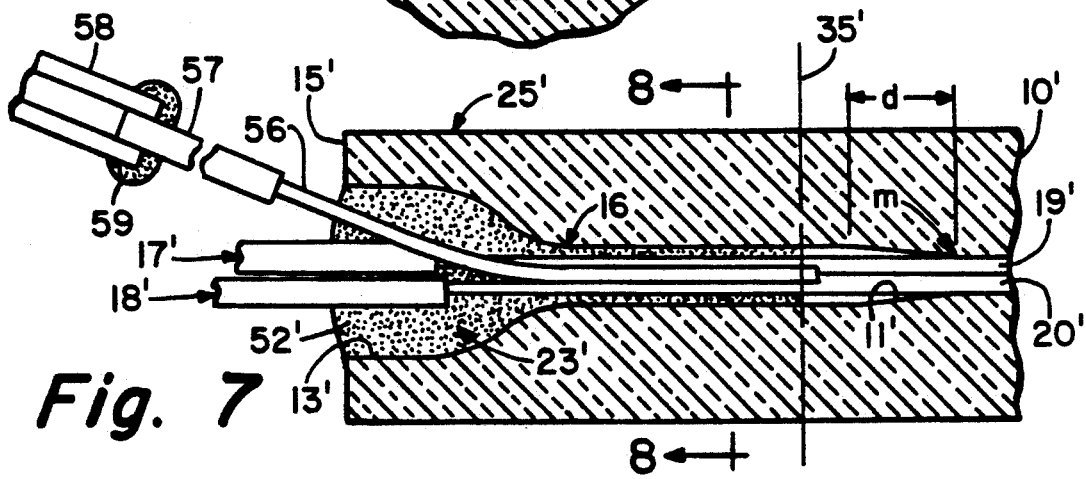

1

METHOD OF MAKING ROBUST FIBER OPTIC COUPLER

BACKGROUND OF THE INVENTION

This invention relates to a method of making fiber optic couplers that can withstand relatively wide temperature excursions and mechanical influences such as pulling on the optical fiber pigtails extending therefrom.

Fiber optic couplers referred to as "fused fiber couplers" have been formed by positioning a plurality of fibers in a side-by-side relationship along a suitable length thereof and fusing the claddings together to secure the fibers and reduce the spacings between the cores.

Various coupler properties can be improved by encapsulating the coupling region of the fibers in a matrix glass to form an "overclad coupler". Portions of the fibers to be fused are inserted into a glass tube having a refractive index lower than that of the fiber claddings. The tube has a longitudinal bore, each end of which is connected to the tube end surfaces by a funnel that facilitates the insertion of the fibers. The tube midregion is collapsed onto the fibers; the central portion of the midregion is then drawn down to that diameter and coupling length which is necessary to obtain the desired coupling.

After the midregion of the coupler has been collapsed (see FIG. 2), the fibers in the collapsed region are fused to the tube glass. The tube glass usually flows around and completely encases the fibers as shown in FIG. 2a, although it may be desirable, for certain applications, to maintain narrow, elongated open regions or air lines adjacent the fibers in the coupling region. Progressing from the collapsed midregion toward the uncollapsed portion of the tube bore, a cross-section through the preform reveals small air lines that begin to form at points 28 adjacent the fibers. At a greater distance from the collapsed midregion, the air lines enlarge as shown in FIG. 2b wherein the fibers are connected to the tube by narrow bridging regions 29 and to each other by narrow bridging regions 30. At some distance from the collapsed midregion, the fibers are separated from each other and from the tube as shown in FIG. 2c. The ends of the narrow bridging regions 29 and 30 are potential fiber break initiation sites. When an axial pulling force is applied to a fiber, breakage often occurs in this region of the coupler. This region, which is referred to herein as the "weakened region" of the fibers, usually occurs somewhere within the distance d which is about 5 mm from the end m of the collapsed midregion.

After the coupler has been stretched and cooled, a drop of glue is applied to each funnel to increase the pull strength of the fiber pigtails. Air trapped in the bore tends to keep glue in the funnel from penetrating into the bore. Techniques for increasing the depth of penetration of the glue into the uncollapsed portion of the tube bore are disclosed in U.S. patent application Ser. No. 07/913,622 (Berkey et al. 26-7) filed Jul. 16, 1992. In a first embodiment, glue is applied to the funnel. Before the glue is cured, a sufficient period of time is allowed to elapse to permit beads of glue to flow by capillary action between the fibers and the adjacent portion of the wall of the bore portion. The glue preferably flows at least 3 mm into the bore portion beyond the bottom of the funnel. The glue is then cured. In a second embodiment, a hollow filament is inserted into the uncollapsed bore portion, and a vacuum is applied to the filament. Glue, which is applied to the funnel, is drawn into the uncollapsed bore portion due to the evacuated condition thereof.

Under severe thermal cycling, the weakened region of the fibers has been known to break, primarily because of a thermal coefficient of expansion mismatch between the glue and the glass coupler components. Because of the angle of the funnel walls with respect to the bore axis, the thermal expansion mismatch causes the glue in the funnel to expand longitudinally outwardly and pull the fibers embedded therein away from the collapsed midregion, thereby stressing the fibers. If the uncollapsed portion of the tube bore is fully filled with glue, the fibers can be stressed by the presence of voids or other azimuthal inhomogeneities. Moreover, even a thin bead of glue that has wicked down the fiber to the bridging region may weaken the fiber during thermal cycling. When such glue is situated in the narrow bridging region 29 between the fiber and tube wall, it can act as a wedge as it expands due to an increase in temperature. If a fiber breaks away from the tube wall, i.e. the bridging region fractures, the damaged region of the fiber becomes a flaw from which crack propagation will initiate if the fiber is subjected to tensile stress.

It is therefore desirable to cause glue to flow a sufficient distance below the funnel to provide adequate pull strength, but to prevent the flow of glue over the bridging regions. Process reproducibility would be enhanced if the glue could be made to consistently flow to some predetermined narrow region below the tube endface. For example, the region could extend to some point in the tube bore a given distance above that region where fiber begins to bridge to the tube, i.e. the end of bridging regions 29. The techniques disclosed in the aforementioned Berkey et al. patent application do not consistently cause the glue to extend to a predetermined region within the uncollapsed bore.

When making a fused biconically tapered coupler such as that disclosed in U.S. Pat. No. 5,013,117, two or more fibers are fused together and stretched to form a coupling region. The resultant coupler, which is not supported by an overclad tube, is extremely fragile and must be attached to support means. For example, the ends of a coupler can be glued to a substrate. Some of the glue can wick between the fibers toward the coupling region. If the glue reaches the bridging region where the fibers begin to fuse together, it can cause failure during thermal cycling for reasons discussed above. The reproducability of the method of making this type of coupler would also be enhanced if the glue could be made to extend to a region that is sufficiently spaced from the bridging region.

SUMMARY OF THE INVENTION

It is therefore an object of the present invention to provide a reproducible method of making mechanically and thermally robust fiber optic couplers.

In the method of making a fiber optic coupler, there is initially formed an intermediate coupler device wherein at least two optical fibers extend in side-by-side fashion. The intermediate coupler device includes (a) a coupling region in which a portion of each of the optical fibers are fused together, (b) first and second discrete fiber regions spaced from the coupling region, and (c) first and second transition regions between the coupling region and the first and second discrete fiber regions, respectively. The fibers are unfused in the discrete fiber regions. The fused area of contact between any two adjacent fibers decreases in the transition regions with increasing distance from the coupling region.

A drop of energy curable glue is applied to the first discrete fiber region and to a substrate, such that the glue flows toward the first transition region. A source of the glue curing energy is positioned such that a beam therefrom intercepts the fibers at a predetermined point between the first transition region and the point of initial application of the glue, whereby glue that flows from the drop to the beam is cured and stops flowing. The remainder of the drop of glue is cured, thereby affixing the first transition region to the substrate.

In one embodiment, the intermediate coupler device is composed of a plurality of optical fibers that extend in side-by-side fashion through a coupling region and through the bore of a tube situated longitudinally adjacent the coupling region. The fibers are fused together in the coupling region, the diameters of the fibers in the coupling region being smaller than the diameters thereof in the tube. The fibers are surrounded by a drop of glue at that end of the tube bore opposite the coupling region.

In accordance with another embodiment, the intermediate coupler device is formed by supporting a plurality of optical fibers in side-by-side fashion and heating a region of the fibers intermediate the ends thereof to fused them together. The discrete fiber regions are glued to an adjacent substrate.

BRIEF DESCRIPTION OF THE DRAWINGS

FIG. 5 is a partial cross-sectional view taken along lines 5—5 of FIG. 4 after glue has wicked down the optical fibers.

FIG. 6 is a schematic illustration of an apparatus for collapsing a capillary tube, stretching the midregion thereof, and optionally supporting it during the glue application process.

FIG. 7 is a cross-sectional view of an end region of a coupler showing a modification of the glue application technique.

FIG. 8 is a partial cross-sectional view taken along lines 8—8 of FIG. 7.

DETAILED DESCRIPTION

Figures 1, 2, 2A, 2B, 3:
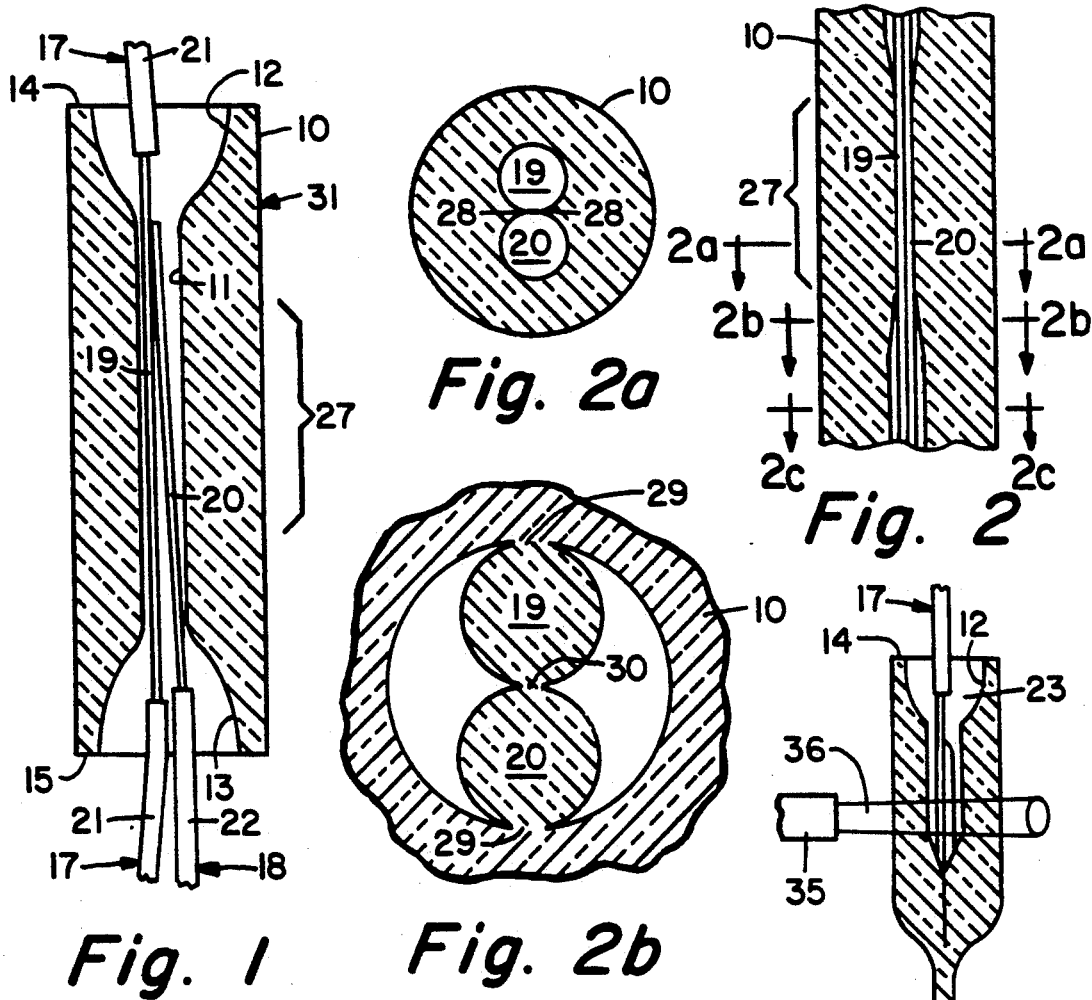
FIG. 1 is a cross-sectional view of a capillary tube after optical fibers have been inserted therein.
FIG. 2 is a partial cross-sectional view illustrating the collapse of the glass tube around the fibers to form a solid midregion., FIGS. 2a, 2b, and 2c cross-sectional views taken along lines 2a—2a, 2b—2b, and 2c—2c, respectively, of FIG. 2.
FIG. 3 is a partial cross-sectional illustration of a fiber optic coupler after it has been drawn down.

The drawings are not intended to indicate scale or relative proportions of the elements shown therein.

Overclad fiber optic couplers can be formed by the method disclosed in U.S. Pat. No. 5,011,251, which is incorporated herein by reference. The 1×2 coupler described herein is deemed to be typical of MxN couplers, where $M \geq 1$ and $N \geq 2$. Protective coating material 21, 22 is stripped from the appropriate portions of coated optical fibers 17 and 18 (FIG. 1), and they are threaded into the longitudinal bore 11 of capillary tube 10, the uncoated fiber portions 19 and 20 extending through tube midregion 27. Tube 10 is preferably composed of silica doped with $B_2O_3$ and optionally fluorine. It can be made softer by adding a dopant such as $GeO_2$, and adjusting the refractive index by adding additional $B_2O_3$. Funnels 12 and 13 form entrances to bore 11 at end surfaces 14 and 15.

Tube 10 is inserted through ring burner 34 (FIG. 6) and is clamped to draw chucks 32 and 33 which are mounted on motor controlled stages 45 and 46. Coated fiber 17 is inserted through bore 11 until its uncoated portion is situated below tube end surface 15. The uncoated portion of coated fiber 18 is held adjacent the uncoated portion of coated fiber 17, and both are moved together toward tube end 14 until the coating end regions are located in funnel 13, the uncoated fiber portions then being located intermediate end surfaces 14 and 15. The end of fiber 18 is located between midregion 27 and end 14 of tube 10. The fibers are threaded through the vacuum attachments 41 and 41', which are then sealed to the ends of preform 31. Typical vacuum attachments are disclosed in U.S. Pat. No. 5,017,206 which is incorporated herein by reference. Vacuum is supplied to tube 41 through line 42. One end of a length of thin rubber tubing 43 is attached to that end of vacuum attachment 41 opposite preform 31; the remaining end of the tubing extending within tube clamping means (not shown). Upper vacuum attachment 41' is similarly associated with line 42', tubing 43' and tube clamping means. The coated portions of the fibers extend from tubing 43 and 43'. When air pressure is built up within the clamping means and directed against tubing 43 and 43' as indicated by arrows 44, 44', to clamp the tubing against the fibers extending therethrough, bore 11 is evacuated through lines 42 and 42'.

While preform 31 is evacuated, ring burner 34 heats tube 10, causing midregion 27 to collapse onto the optical fibers (FIG. 2). Thereafter, at least the central portion of midregion 27 is heated, and stages 45 and 46 pull in opposite directions to elongate preform 31 to form an intermediate coupler device 25 having a drawn down region 24 (FIG. 3). A cavity 23, which consists of the uncollapsed end of bore 11 along with the respective funnel, exists at each end of intermediate coupler device 25.

It has been conventional practice to place a drop of glue in each funnel to increase the pull strength of the optical fiber pigtails extending from the ends of the coupler. If the tube did not have funnels, the drop of glue would be placed at the end of the tube. Because of the small diameter of the bore 11 portion of cavities 23, the glue initially extends no deeper than the bottom 16 of funnel 13. Various techniques are disclosed for causing the glue to flow into the bore.

Figure 4:
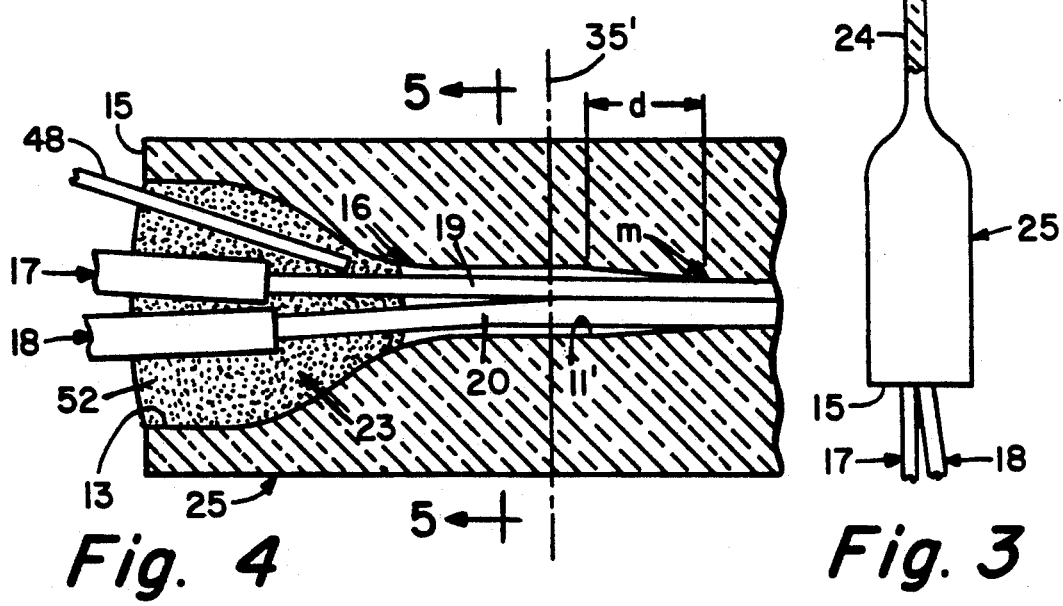
FIG. 4 is a cross-sectional view of an end region of the coupler of FIG. 3 after glue has been injected into the funnel.

In accordance with the technique illustrated in FIGS. 4 and 5, the glue is applied in such a manner that it "wicks" down the wall of the bore adjacent the optical fibers. A syringe is filled with glue, and its applicator needle 48 is inserted into funnel 13. A sufficient amount of glue is injected into the funnel to cover the bare regions of the fibers that extend into the funnel. The glue preferably extends to the bottom 16 of the funnel.

If the glue is not cured immediately after it is injected into the funnel, it will "wick" down the wall of the funnel and bore adjacent the optical fibers. By "wick" is meant that the glue flows by capillary action between each fiber and the adjacent surface of the bore to form elongated beads 53 which affix the fibers to the tube wall that forms bore 11 (see FIG. 5). Glue beads 53 transfer externally and internally generated loads from the fibers to the tube. Glue should wick at least 3 mm beyond funnel bottom 16 into bore 11'; this distance is sufficient to transfer most of the pulling force from the fiber to the wall of the tube bore. The wicking process may also result in the flow of glue between adjacent fibers to form bead 54. Wicking time depends on such parameters as the temperature of coupler tube, the viscosity of glue and the depth of uncollapsed bore.

Heretofore, a sufficient time was allowed to pass for the glue that flows by wicking action to extend the minimum required distance down the bore. At the end of the predetermined period of time required for wicking, the glue was then cured by ultraviolet light, heat or the like, and the coupler body was released from the chucks.

However, the allotted time may be sufficiently long that one or more of the glue beads occasionally extends to the bridging regions 29 and 30 (FIG. 2b), in which case they may adversely affect the mechanical thermal performance of the coupler. Alternatively, some parameter such as glue viscosity could be such that the glue does not wick far enough into the bore during the alloted time period.

In accordance with the invention, a source of energy such as a UV light source 35 is mounted adjacent intermediate coupler device 25 (FIG. 3). In FIG. 4, the edge of the UV light beam is represented by broken line 36', and the beam extends to the right of that line. As the glue beads reach the beam, the curing process is initiated, and the beads stop flowing within a few millimeters, depending on various process conditions including viscosity and curing energy intensity. When the curing beam source is mounted in a support bracket that is aligned with the equipment supporting intermediate coupler device 25, the glue can be made to extend to a region in bore portion 11' that is a predetermined distance from the end of intermediate coupler device 25. Since glue depth can be accurately controlled, reproducibility of the coupler making process is enhanced. The UV light is then directed toward the end of tube 10, and the remainder of the glue is cured.

The glue application process is repeated at the other end of the tube. After the coupler is removed from chucks 32 and 33, the glued regions can be subjected to additional UV energy to ensure that all of the glue is completely cured.

Another embodiment is illustrated in FIGS. 7 and 8 wherein the edge of the UV light beam is again represented by broken line 35'. A hollow filament 56 is provided with protective coating 57 so it can be more easily handled. The coated hollow filament is connected to a source of vacuum by inserting it into the end of evacuated tubing 58 and sealing the junction with glue 59. A sufficient length of coating 57 is removed from the end of filament 56 to permit the filament to extend to the desired depth in cavity 23'. The tip of filament 56 extends into the UV light beam, but it should not extend to the bridging region of the fibers, since contact with the fibers in that region could result in the severing of a bridging region and thus weaken the fiber. A simple technique for obtaining the proper filament insertion distance is shown in FIG. 6. The end of filament 57 is located at some predetermined point such as the top of chuck 33, and a section of the filament remote from the end is secured by clamp 49. When the end of the filament is inserted into bore 11', it extends to the desired depth therein When a drop of glue 52' is placed in funnel 13', the low pressure provided by filament 56 pulls the glue to that depth within the cavity where the glue is illuminated and thus cured by beam 35'. Those portions of fibers 19' and 20' within cavity 23' are thus completely immersed in glue to that predetermined depth where the beam is located. Hollow filament 56 is then snapped off, and a drop of glue is placed at its exposed end. The remainder of the glue is then cured as described above.

In yet another embodiment, the glue is drawn less than the entire predetermined distance into the bore by the bore evacuation technique of FIG. 7, and a sufficient period of time is then allowed to pass to ensure that the glue wicks to the UV light beam. Partially filling the bore prior to wicking is beneficial in that it places glue in the bore prior to the wicking process, thereby decreasing the wicking time and ensuring that the proper wicking action occurs. The hollow filament is snapped off and glued, and the remainder of the glue is cured.

Figure 9:
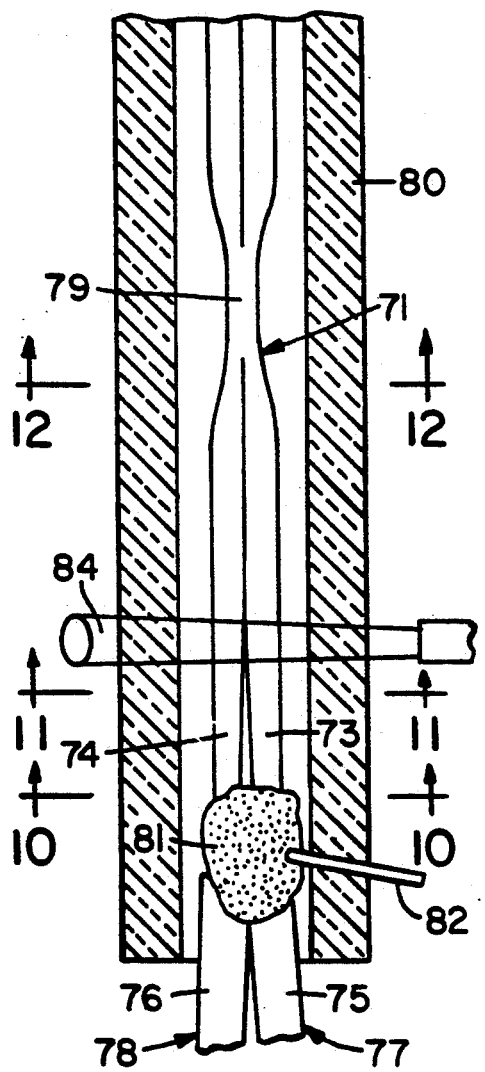
FIG. 9 is a plan view of a biconically tapered coupler fixed to a protective member.
Figure 10:
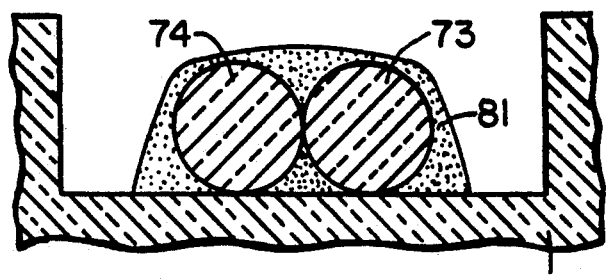
FIGS. 10, 11 and 12 are cross-sectional views taken along lines 10—10, 11—11 and 12—12, respectively, of FIG. 9.
Figure 11:
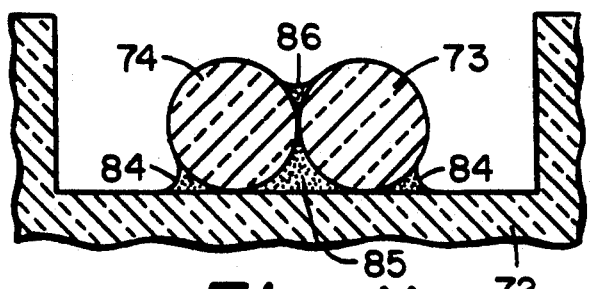
Figure 12:
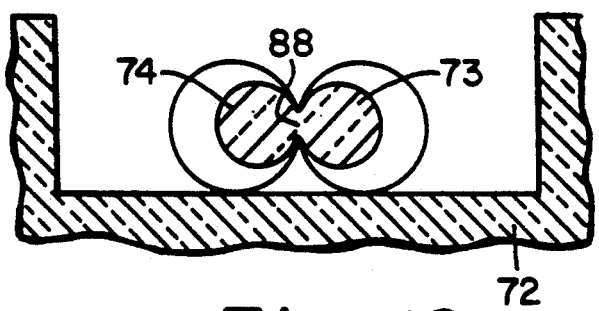

The method of the invention can also be employed with fused biconically tapered couplers of the type disclosed in U.S. Pat. 5,013,117. As shown in FIG. 9, coatings 75 and 76 are stripped from portions of coated optical fibers 77 and 78, respectively, intermediate their ends. The stripped portions 73 and 74 of the fibers are brought into contact, the contacted areas are heated to fuse them in parallel, and the fibers are stretched along the optical axis. Coupler 71 is then bonded to substrate 80 by applying a drop of glue 81 to each end of the coupler from applicator needle 82. Drop 81 covers fibers 73 and 74 (FIG. 10) and at least a portion of coatings 75 and 76. With the passage of time, beads 84, 85 and 86 of glue can wick between the fibers and substrate (FIG. 11). If the glue wicks to the taper region where the fibers are connected by bridging region 88 (FIG. 12), or the tapered region adjacent the bridging region, it can change the coupling ratio, can potentially cause excess loss to increase, and can result in a breakage problem. To prevent glue from wicking too far along the fibers toward fused region 79, UV light beam 84 is directed onto the fibers to cure the wicking glue as described above. The glue thus extends only to the predetermined region determined by the edge of beam 84.

A 1×2 fiber optic coupler was made in accordance with the following specific example. The dimensions of glass tube 10 were: 3.8 cm length, 2.6 mm outside diameter, and 265 μm bore diameter. Each of the funnels 12 and 13 was formed by flowing the gas phase etchant $NF_3$ through the tube while uniformly heating the end of the tube. Funnels 12 and 13 were about 1.71 mm deep, and their maximum diameters were about 1.81 mm. Coated fibers 17 and 18 consisted of 125 μm diameter single-mode optical fibers 19 and 20 having 250 μm diameter urethane acrylate coatings 21 and 22, respectively. A 6 cm long section of coating was removed from the end of a 1.5 meter length of coated fiber 18. An antireflection was formed on the end of fiber 18 by directing a flame at the center of the stripped region of fiber, while the end of the fiber was pulled and severed to form a tapered end. The tip of fiber 20 was heated by a burner flame to cause the glass to recede and form a rounded endface. The resultant stripped end region as about 3.2 cm long. Approximately 3.2 cm of coating was stripped from the central region of a 3 meter length of coated fiber 17.

Tube 10 was inserted into the apparatus of FIG. 6, and the fibers were inserted into tube 10 as described above. Vacuum attachments 41 and 41' were attached to the ends of preform 31, and a vacuum of 7-12 inches (18-56 cm) of mercury was connected to the vacuum attachments. Ring burner 34 was ignited, and its flames heated tube 10, causing tube midregion 27 to collapse onto the fibers. After the tube cooled, the burner was reignited to heat the center of the collapsed region The flame was turned off, and stages 45 and 46 were operated to form neckdown region 24 (FIG. 3). After the coupler cooled, the vacuum lines were removed. The coupler remained in the chucks during the application of glue to cavities 23.

Clamps 44 and 44' were released from the flexible vacuum hoses 43 and 43', and nitrogen was supplied to hoses 42 and 42'. The turbulence created by the nitrogen flowing through tubes 43 and 43' enhanced the release of the fiber from those tubes. Upon completion of the nitrogen purge, vacuum attachments 41 and 41' were removed.

About 30 cm of 80 μm hollow silica filament 56 was provided. The filament had a 200 μm outside diameter coating of urethane acrylate. One end of the coated filament was glued in one end of a tube 58, the other end of which was adapted to be connected to a source of vacuum. About 2.5 cm of coating was stripped from the remaining end of the hollow filament. Filament 56 was inserted into bore portion 11' until it extended 7-8 mm from end surface 15.

A syringe was filled with Electrolyte UV cure epoxy resin code number 2500 UV manufactured by Electronic Materials Inc. of New Milford, Connecticut. The applicator needle was inserted into the lower funnel 13 of the coupler preform, and the needle was carefully manipulated into the bottom region of the funnel. A sufficient amount of epoxy was injected into the funnel to fill it and cover the bare fibers. Care was taken to minimize the amount of glue that extended exterior to the funnel.

The cylindrically shaped output wand 35 of a Dymax PC3 UV light source was placed in annular recess 47 in chuck 33 of the apparatus of FIG. 6. When the beam was turned on, it radiated upon preform 31 and extended to within 6-8 mm from end surface 15. Hollow filament 56 extended about 1-2 mm into the UV beam.

Cavity 23' was then evacuated through the hollow filament, thus drawing the epoxy into bore portion 11'. When the epoxy reached the UV beam, it was cured thereby and stopped flowing. Filament 56 was snapped off, and a drop of epoxy was placed at its exposed end. The UV source was removed from recess 47' and the UV beam was directed onto that portion of preform 31 between chuck 33 and vacuum attachment 41 to further cure the epoxy.

Wand 35 was moved to recess 47' of chuck 32, and the epoxy application and curing procedure was repeated at the upper end of preform 31. The coupler was removed from the chucks. To ensure full initiation of the epoxy, the coupler was placed on a white background and was exposed to UV light from a Bondwand UV curing wand for a minimum of 15 minutes.

Based on predicted stresses which could lead to failure during long term usage of the above-described 1×2 couplers, it was determined that the epoxy should extend to a region that was 3 to 8 mm from the ends of preform 31. In 97% of the fiber optic couplers produced by this method, the end of the glue was no further than 0.1 mm outside this range. Such couplers have shown excellent mechanical thermal performance, and the fiber pigtails of such couplers exhibit high pull strength.

We claim

1. A method of making a fiber optic coupler comprising the steps of
   forming an intermediate coupler device wherein at least two optical fibers extend in side-by-side fashion, said intermediate coupler device including a coupling region in which a portion of each of said optical fibers are fused together, first and second discrete fiber regions spaced from said coupling region, said fibers being unfused in said discrete fiber regions, and first and second transition regions between said coupling region and said first and second discrete fiber regions, respectively, the fused area of contact between any two adjacent fibers decreasing in said transition regions with increasing distance from said coupling region,
   applying a drop of energy curable glue to said first discrete fiber region and to a substrate, such that said glue flows toward said first transition region,
   positioning a source of said energy such that a beam therefrom intercepts said fibers at a predetermined point between said first transition region and the point of initial application of said glue, whereby glue that flows from said drop to said beam is cured and stops flowing, and
   curing the remainder of said drop of glue, whereby said first transition region is affixed to said substrate.

2. A method in accordance with claim 1 wherein the step of forming comprises forming an intermediate coupler device composed of a plurality of contiguously extending optical fibers, said fibers extending through a coupling region and through the bore portion of a tube situated longitudinally adjacent said coupling region, said fibers being fused together ins aid coupling region, the diameters of said fibers in said coupling region being smaller than the diameters thereof in said tube.

3. A method in accordance with claim 2 wherein the step of applying comprises surrounding said fibers with a drop of glue at that end of said tube bore opposite said coupling region, the small diameter of said bore inhibiting the filling of said bore with said glue, and flowing said glue by capillary action between at least one of said fibers and the adjacent wall of said bore.

4. The method of claim 3 wherein said intermediate coupler device further comprises a funnel at that end of said tube bore opposite said coupling region, the step of surrounding said fibers with glue comprising applying glue to said funnel.

5. The method of claim 4 wherein, prior to the step of applying glue to said funnels, said method further comprises the step of inserting a hollow filament through said funnel and into said uncollapsed bore portion, said method further comprising the step of evacuating said filament to draw said glue into said uncollapsed bore portion, and allowing a sufficient period of time to elapse permitting said glue to flow by capillary action deeper into said bore portion until it reaches said beam.

6. The method of claim 1 wherein, prior to the step of applying glue to said funnels, said method further comprises the step of inserting a hollow filament through said funnel and into said uncollapsed bore portion, said filament extending into said beam and evacuating said filament to draw said glue into said uncollapsed bore portion until it reaches said beam.

7. The method of claim 6 wherein said intermediate coupler device further comprises a funnel at that end of said tube bore opposite said coupling region, the step of surrounding said fibers with glue comprising applying glue to said funnel.

8. A method in accordance with claim 1 wherein the step of forming comprises forming an intermediate coupler device composed of a plurality of contiguously extending optical fibers, said fibers extending through a coupling region and through the bore portion of a tube situated longitudinally adjacent said coupling region, said fibers being fused together in said coupling region, the diameters of said fibers in said coupling region being smaller than the diameters thereof in said tube.

9. A method in accordance with claim 1 wherein the step of forming comprises forming an intermediate coupler device composed of an elongated body of matrix glass having first and second end surfaces, a midregion and first and second opposite end regions extending from said midregion to said first and second end surfaces, respectively, a plurality of optical fibers extending through said midregion, said fibers being fused together along with said midregion, the diameter of the central portion of said midregion and the diameters of said fibers in said central portion being smaller than the diameters thereof at said end regions, first and second portions of uncollapsed longitudinal bore extending longitudinally from said midregion into said first and second end regions, respectively, first and second funnels connecting said first and second bore portions, respectively, to said first and second end surfaces, respectively, at least one of said fibers extending through said first bore portion and said first funnel and from said first end surface, at least one other of said fibers extending through said second bore portion and said second funnel and from said second end surface, and the step of applying comprises applying glue to said first funnel.

10. A method in accordance with claim 1 wherein the step of forming comprises
   providing a glass tube having first and second end surfaces, a midregion and first and second opposite end regions extending from said midregion to said first and second end surfaces, respectively, a longitudinal bore extending within said tube, first and second funnels extending from said bore to said first and second end surfaces, respectively,
   disposing within said longitudinal bore at least two glass optical fibers, each having a core and cladding, a portion of each of said fibers extending through said midregion, at least a portion of each of said fibers extending from at least one of said the ends of said tube, those portions of said fibers that extend from said tube having protective coating thereon,
   heating said tube to collapse said tube midregion onto said fibers, first and second portions of uncollapsed bore extending longitudinally from said midregion through said first and second end regions, respectively, to said first and second funnels, respectively, and
   drawing at least a portion of said midregion such that the diameter of the central portion of said midregion and the diameters of said optical fibers in said central portion are smaller than the diameters thereof at said end regions, and wherein the step of applying comprises applying glue to said first funnel.

11. A method in accordance with claim 1 wherein the step of forming comprises
   forming an intermediate coupler device composed of an elongated body of matrix glass having first and second end surfaces, a midregion and first and second opposite end regions extending from said midregion to said first and second end surfaces, respectively, a plurality of optical fibers extending through said midregion, said fibers being fused together along with said midregion, the diameter of the central portion of said midregion and the diameters of said fibers in said central portion being smaller than the diameters thereof at said end regions, first and second portions of uncollapsed longitudinal bore extending longitudinally from said midregion into said first and second end regions, respectively, first and second funnels connecting said first and second bore portions, respectively, to said first and second end surfaces, respectively, at least one of said fibers extending through said first bore portion and said first funnel and from said first end surface, at least one other of said fibers extending through said second bore portion and said second funnel and from said second end surface, and
   evacuating said uncollapsed bore portions, and wherein the step of applying comprises applying glue to said first funnel.

12. A method in accordance with claim 1 wherein the step of forming comprises supporting a plurality of optical fibers in side-by-side fashion, heating a region of said fibers intermediate the ends thereof to fuse them together.

13. A method in accordance with claim 1 wherein the step of positioning comprises placing said energy source in a bracket that is located such that the beam therefrom impinges upon a predetermined region of said intermediate coupler device.

14. A method in accordance with claim 1 wherein the step of forming is performed in an apparatus including first and second chucks that support said intermediate coupler device, said chucks being shaped to receive said energy source in such a manner that the beam therefrom impinges upon a predetermined region of said intermediate coupler device.

15. A method in accordance with claim 4 wherein said energy source is cylindrically shaped and said chucks contain annular recesses for receiving said source.

* * * * *